US012583748B2

(12) United States Patent
Mao et al.

(10) Patent No.:  US 12,583,748 B2
(45) Date of Patent:  Mar. 24, 2026

(54) PREPARATION METHOD OF CESIUM DIFLUOROPHOSPHATE FOR AQUEOUS NEGATIVE ELECTRODE SLURRY, NEGATIVE ELECTRODE SLURRY, NEGATIVE ELECTRODE PLATE, AND SECONDARY BATTERY

(71) Applicant: Zhuhai Smoothway Electronic Materials Co., Ltd., Zhuhai City (CN)

(72) Inventors: Chong Mao, Zhuhai City (CN); Jing Bai, Zhuhai City (CN); Pipi Wang, Zhuhai City (CN); Dongyou Pan, Zhuhai City (CN); Yi An Zeng, Zhuhai City (CN); Wenliang Dai, Zhuhai City (CN); Xiaobing Dai, Zhuhai City (CN)

(73) Assignee: ZHUHAI SMOOTHWAY ELECTRONIC MATERIALS CO., LTD., Zhuhai City (CN)

( * ) Notice: Subject to any disclaimer, the term of this patent is extended or adjusted under 35 U.S.C. 154(b) by 816 days.

(21) Appl. No.: 17/934,078

(22) Filed: Sep. 21, 2022

(65) Prior Publication Data

US 2023/0105835 A1      Apr. 6, 2023

(30) Foreign Application Priority Data

Sep. 24, 2021    (CN) .......................... 202111125644.X

(51) Int. Cl.
| | |
|---|---|
| *H01M 10/052* | (2010.01) |
| *C01B 25/30* | (2006.01) |
| *H01M 50/46* | (2021.01) |

(52) U.S. Cl.
CPC ......... *C01B 25/308* (2013.01); *H01M 10/052* (2013.01); *H01M 50/46* (2021.01); *C01P 2004/60* (2013.01)

(58) Field of Classification Search
CPC .... C01B 25/30; C01B 25/308; H01M 10/052; H01M 50/46
USPC ...................................................... 429/231.9
See application file for complete search history.

(56) References Cited

U.S. PATENT DOCUMENTS 9,093,716 B2 *    7/2015    Tokuda et al. .... H01M 10/0569
2022/0367915 A1 *  11/2022    Kondo et al. ..... H01M 10/0568

FOREIGN PATENT DOCUMENTS

CN          107565135 A      1/2018

OTHER PUBLICATIONS

Yang Bin et al., Study On Extracting Metallic Lithium From Li2CO3 By Vacuum Metallurgy, Yunnan Science and Technology Press, May 31, 1999, p. 8.

* cited by examiner

*Primary Examiner* — Kevin P Kerns
(74) *Attorney, Agent, or Firm* — SHIMOKAJI IP

(57)          ABSTRACT

A preparation method of CsDFP for aqueous negative electrode slurry includes carrying out ion exchange reactions with $LiPO_2F_2$ and a cesium source. The activation energy of $Li^+$ intercalation in the negative electrode is reduced due to the existence of $Cs^+$, leading to a better rate performance. Further, the impedance growth rate of the batteries is reduced and the high temperature storage performance is excellent since $PO_2F_2-$ participates in the electrochemical reaction to form a stable low-impedance SEI film on the surface of the negative electrode plate. Moreover, films are continuously formed to repair the SEI films under the gradual release of CsDFP, which is conducive to inhibiting the growth of lithium dendrites during long-term high-rate cycling, thereby obtaining an improved cycle performance.

10 Claims, 4 Drawing Sheets

PREPARATION METHOD OF CESIUM
DIFLUOROPHOSPHATE FOR AQUEOUS
NEGATIVE ELECTRODE SLURRY,
NEGATIVE ELECTRODE SLURRY,
NEGATIVE ELECTRODE PLATE, AND
SECONDARY BATTERY

FIELD OF THE INVENTION

The invention relates to the technical field of electrochemistry, in particular to a preparation method of cesium difluorophosphate (CsDFP) used for aqueous negative electrode slurry, negative electrode slurry, a negative electrode plate and a secondary battery.

BACKGROUND OF THE INVENTION

Lithium secondary batteries are widely used in Computer-Communication-Consumer (3C) electronics digital products, power tools, aerospace, energy storage, power vehicles and other fields due to their high specific energy, no memory effect, and long cycle life. With the rapid development of electronic information technology and consumer products, there is an urgent demand for lithium secondary batteries with higher rate performance and wider temperature performance.

At present, graphite materials are mainly used as the negative electrode active materials of commercially available lithium secondary batteries. However, in the actual charging and discharging process, it's required high activation energy to intercalate $Li^+$ into graphite due to the limited lithium ion conductivity of graphite. Especially in the case of high-rate charging, some lithium ions cannot be intercalated into the graphite negative electrode to become inactive "dead" lithium on the surface of the negative electrode, which grows during the cycle for a long time to form lithium dendrites to possibly pierce the separator, resulting an internal short circuit in the battery, and accordingly causing the battery to suddenly decline or even catch fire.

It has been proposed that the low-temperature performance of lithium secondary batteries can be improved by adding cesium salts such as cesium hexafluorophosphate ($CsF_6P$) to the electrolyte, to prevent the formation of lithium dendrites in the case of high-rate charging or low-temperature charging. It's even possible to prevent lithium precipitation at low temperatures by adding combination of cesium salts and nitrile additives. However, $CsF_6P$ is easily soluble in the electrolyte and consumed at one time in the formation stage. As the impedance of the battery increases during cycling, the SEI film formed by one-time consumption will gradually rupture and cannot be repaired. Therefore, such a proposal is not conducive to inhibiting the growth of lithium dendrites during long-term high-rate cycling. It has been also proposed that the DC impedance of lithium secondary batteries can be reduced by adding lithium difluorophosphate ($LiPO_2F_2$) to the electrolyte, but the aforementioned problems of soluble in the electrolyte and consumed at one time in the formation stage, and the lithium dendrites growth are still pending.

SUMMARY OF THE INVENTION

Objectives of the present invention are to provide a preparation method of cesium difluorophosphate (CsDFP) for aqueous negative electrode slurry, negative electrode slurry, a negative electrode plate and a secondary battery. In such a manner of using CsDFP in the negative electrode slurry, films can be continuously formed to repair the solid electrolyte interface (SEI) film, which is beneficial to inhibit the growth of lithium dendrites during long-term high-rate cycling, reduce the activation energy of lithium ions intercalated into the negative electrode (that is, it is easier for the intercalation and deintercalation of the lithium ions), reduce the impedance growth rate of the battery, and improve the cycle life, the high temperature storage performance and the rate performance accordingly.

To achieve the above objectives, as a first aspect of the present invention, a preparation method of CsDFP for aqueous negative electrode slurry includes carrying out ion exchange reactions with $LiPO_2F_2$ and a cesium source to yield CsDFP. The preparation method is simple, the raw materials are readily available, the yield is high and the impurities are few, specifically the yield can reach 87% to 98%, and the purity can reach more than 99%.

As a second aspect of the present invention, a negative electrode slurry includes 90 to 96.25 parts by weight of negative electrode active material, 0.1 to 1 parts by weight of a thickener, 0.1 to 3 parts by weight of a conductive agent, 0.5 to 4.5 parts by weight of a binder and 2.5 to 5 parts by weight of CsDFP, and the negative electrode slurry has a viscosity which is adjusted to 2000 to 14000 mPa·s with a solvent. In such a preparation method, CsDFP and other materials are compatible and uniformly dispersed in the negative electrode slurry, since CsDFP is easily soluble in water and unreactable with water. In addition, CsDFP has a very low solubility (<1000 ppm) in carbonate-based and/or carboxylate-based electrolytes, thus CsDFP in the negative electrode plate will gradually release into the electrolyte and participate in the electrochemical reaction, after the negative electrode plate is wetted in the electrolyte during battery cycling. Furthermore, the activation energy of $Li^+$ intercalation in the negative electrode is reduced due to the existence of $Cs^+$, that is, it's easier for the lithium ions to intercalate in or deintercalate from the negative electrode, which leads to a better rate performance. On the other hand, the impedance growth rate of the batteries is reduced and the high temperature storage performance is excellent since $PO_2F_2-$ participates in the electrochemical reaction to form a stable low-impedance SEI film on the surface of the negative electrode plate. Moreover, films are continuously formed to repair the SEI films under the gradual release of CsDFP, which is conducive to inhibiting the growth of lithium dendrites during long-term high-rate cycling, thereby obtaining an improved cycle performance.

As a third aspect of the present invention, a preparation method of negative electrode plate includes beating the negative electrode slurry, then coating the negative electrode slurry on a negative electrode current collector to form a negative electrode film, drying and then rolling the negative electrode film to obtain a negative electrode plate. The preparation process of the negative electrode plate is simple, operative, and low in cost. By using CsDFP in the negative electrode slurry, a secondary battery with improved rate performance, high temperature storage performance and long-term cycle performance can be obtained by conventional coating the slurry, drying and rolling processes. Specifically, in the prepared negative electrode plate, CsDFP accounts for 2% to 5.5% of the total weight of the negative electrode plate, which benefits the long-acting slow release effect of CsDFP, and maintains the wettability performance of the electrolyte in the negative electrode plate.

As a fourth aspect of the present invention, a secondary battery includes a positive electrode plate, a negative electrode plate and a separator spaced between the positive electrode plate and the negative electrode plate. Such a secondary battery of the present invention has improved rate performance, high temperature storage performance and long-term cycle performance.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
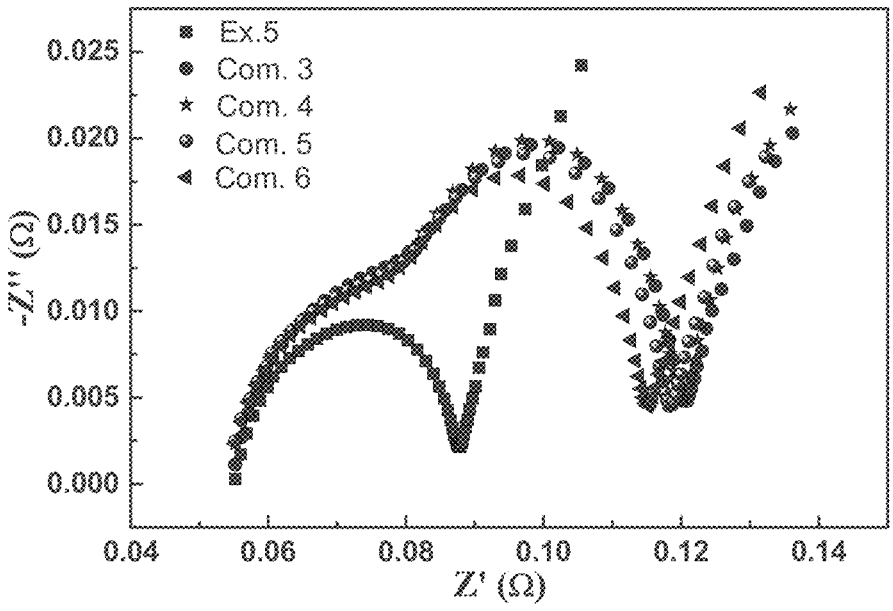
FIG. 1 is a schematic diagram of the impedance of the soft-package lithium secondary batteries in Example 5 and Comparative Examples 3 to 6 after formation.

The first aspect of the present invention provides a preparation method of CsDFP for aqueous negative electrode slurry, which includes carrying out ion exchange reactions with $LiPO_2F_2$ and a cesium source to yield CsDFP. Specifically, the cesium source is cesium fluoride (CsF), cesium hydroxide (CsOH), cesium carbonate ($Cs_2CO_3$) or cesium oxalate (C2Cs2O4).

When CsF is selected as the cesium source, the preparation method includes: dissolving lithium difluorophosphate ($LiPO_2F_2$) in water at 0-10° C., then gradually adding the CsF to mix with the $LiPO_2F_2$ until a reaction is complete, and filtering and drying a filtrate to yield CsDFP. Specifically, $LiPO_2F_2$ and CsF undergo ion exchange reaction at low temperature to produce CsDFP and water-insoluble lithium fluoride. After the reaction is complete, the water-insoluble lithium fluoride is filtered to obtain a cesium difluorophosphate filtrate, which is then dried in vacuum to yield the CsDFP. The reaction is not complete until no precipitate continues to be produced during the reaction, and specifically the reaction time is about 1 h.

When CsOH, $Cs_2CO_3$ or C2Cs2O4 is selected as the cesium source, the preparation method includes: dissolving $LiPO_2F_2$ in absolute ethanol, heating to 60-80° C. and carrying out reflux condensation, and slowly adding absolute ethanol solution of the cesium source and mixing until a reaction is complete, filtering and drying a filtrate to yield the CsDFP. Specifically, the $LiPO_2F_2$ is firstly dissolved in the anhydrous ethanol at a high temperature of 60-80° C., and then ion-exchanged with the cesium source to produce ethanol-soluble CsDFP and insoluble fluoride in ethanol; after the reaction is complete, the water-insoluble lithium compound is filtered to obtain a cesium difluorophosphate filtrate, which is then dried in vacuum to yield the CsDFP. The reaction is not complete until no precipitate continues to be produced during the reaction, and specifically the reaction time is 5-6 h.

Specifically, both the cesium source and the $LiPO_2F_2$ are dehydrated before dissolving in the absolute ethanol, and moisture content of the cesium source and the $LiPO_2F_2$ is less than or equal to 100 ppm after dehydration. The $LiPO_2F_2$ and the cesium source can be dehydrated by vacuum drying and blast drying respectively, and the absolute ethanol can be dehydrated through molecular sieve to reduce its moisture as much as possible. In such a way, the yield of the CsDFP obtained by the preparation method reaches 87-98%, the purity reaches more than 99%, and the particle size is 1-50 nm.

The second aspect of the present invention provides a negative electrode slurry which includes 90 to 96.25 parts by weight of negative electrode active material, 0.1 to 1 parts by weight of a thickener, 0.1 to 3 parts by weight of a conductive agent, 0.5 to 4.5 parts by weight of a binder and 2.5 to 5 parts by weight of CsDFP, and the negative electrode slurry has a viscosity which is adjusted to 2000 to 14000 mPa·s with a solvent.

The content of negative active material may be selected as 90 parts, 90.5 parts, 91 parts, 92 parts, 93 parts, 94 parts, 95 parts, 96 parts, or 96.25 parts, the content of thickener may be selected as 0.1 part, 0.2 part, 0.3 part, 0.4 part, 0.5 part, 0.6 part, 0.8 part, or 1 part, the content of conductive agent may be selected as 0.1 part, 0.3 part, 0.5 part, 1 part, 1.5 parts, 2 parts, 2.5 parts, or 3 parts, the content of the binder may be selected as 0.5 part, 1 part, 1.5 parts, 2 parts, 3 parts, 3.5 parts, 4 parts, or 4.5 parts, and the content of CsDFP may be selected as 2.5 parts, 3 parts, 3.5 parts, 4 parts, 4.5 parts, or 5 parts. Specifically, a solvent may be deionized water, or a mixture of deionized water and an organic solvent, and the organic solvent may be at least one selected from the group consisting of ethanol, ethylene glycol, methanol, isopropanol, acetone and N-methyl pyrrolidone (NMP). The negative active material is at least one selected from the group consisting of natural graphite, artificial graphite, lithium titanate, mesocarbon microbeads, silicon-carbon composite materials and silicon oxide, the thickener is carboxymethyl cellulose and/or sodium carboxymethyl cellulose, the conductive agent is at least one selected from the group consisting of conductive carbon black, acetylene black, carbon nanotubes, vapor-grown carbon fibers and graphene, and the binder is polyacrylic acid and/or styrene-butadiene rubber.

The third aspect of the present invention provides a preparation method of negative electrode plate which includes beating the negative electrode slurry, then coating the negative electrode slurry on a negative electrode current collector to form a negative electrode film, drying and then rolling the negative electrode film to obtain a negative electrode plate. The preparation process of the negative electrode plate is simple, operative, and low in cost. By using CsDFP in the negative electrode slurry, a secondary battery with improved rate performance, high temperature storage performance and long-term cycle performance can be obtained by conventional coating the slurry, drying and rolling processes. Specifically, in the prepared negative electrode plate, CsDFP accounts for 2% to 5.5% of the total weight of the negative electrode plate, which benefits the long-acting slow release effect of CsDFP, and maintains the wettability performance of the electrolyte in the negative electrode plate.

The fourth aspect of the present invention provides a secondary battery which includes a positive electrode plate, a negative electrode plate and a separator spaced between the positive electrode plate and the negative electrode plate. Such a secondary battery of the present invention has better rate performance, high temperature storage performance and long-term cycle performance. The positive electrode plate is obtained by beating the positive electrode slurry, then coating it on a positive electrode current collector to form a positive electrode film, drying and then rolling the positive electrode film. Specifically, the positive electrode slurry may include 93-98 parts by weight of positive active material, 1-8 parts by weight of conductive agent and 1-8 parts by weight of binder. Preferably, the content of the positive active material may be selected as 93 parts, 94 parts, 95 parts, 96 parts, 97 parts, or 98 parts, the content of the conductive agent may be selected as 1 part, 2 parts, 3 parts, 4 parts, 5 parts, 6 parts, 7 parts, or 8 parts, and the content of the binder may be selected as 1 part, 2 parts, 3 parts, 4 parts, 5 parts, 6 parts, 7 parts, or 8 parts. The positive electrode active material includes $Li_{(1+a)}Ni_xCo_yM_zN_{1-x-y-z}O_{2+b}$, $LiCoO_2$ or $LiFePO_4$, where M is Mn or Al, and N is any one of Mg, Cu, Zn, Sn, B, Ga, Cr, Sr, Ba, V and Ti, $-0.10 \leq a \leq 0.50$, $0 < x < 1$, $0 < y < 1$, $0 < z < 1$, $0.7 < x+y+z \leq 1$, $-0.05 \leq b \leq 0.10$. The conductive agent is at least one of conductive carbon black, acetylene black, carbon nanotubes, vapor grown carbon fibers and graphene, and the binder is polyvinylidene fluoride.

The purpose, technical solutions and beneficial effects of the present invention are further described below through specific examples, which is not limited in the present invention however. Examples can be carried out according to the conventional conditions or the conditions suggested by the manufacturer, if no specific conditions are indicated therein. Reagents or instruments in the examples may be the conventional products obtained from the market, if no manufacturer is indicated therein.

Part One of the Experiment (CsDFP Preparation)

Example 1

107.9 g $LiPO_2F_2$ was added into a 1 L of three-necked round flask, 431.6 g deionized water was added to the flask at 0° C., and 151.9 g CsF was gradually added into the flask with a solid feeder, which were stirred for 1 hour until no more lithium fluoride was precipitated out. Then the filtering was performed, and the filtrate was vacuum-dried to obtain 229.2 g CsDFP. The yield thereof was calculated, the purity was measured by AAS, the moisture content was measured by Karl Fischer moisture meter, and the acid value was measured by acid-base titration method, and the results are shown in Table 1.

Example 2

Pretreatment $LiPO_2F_2$ and CsOH were pretreated by vacuum drying and blast drying respectively, and molecular sieves were added in absolute ethanol for dehydration to reduce the moisture content of the raw materials as much as possible, preferably the moisture content is $\leq 100$ ppm.

Preparation 107.9 g pretreated $LiPO_2F_2$ was added to a 1 L of three-necked round flask, 323.7 g absolute ethanol was added, which were placed in an oil bath with the temperature of 70° C., and carried with reflux condensation and stirred fully for 15 min; additionally, 149.9 g pretreated CsOH was dissolved in absolute ethanol, which were then added to the dropping funnel, and slowly dropped into the three-necked round flask for reaction, and the reaction was continued for 5-6 hours, until no lithium hydroxide precipitate was precipitated during the reaction, indicating that the reaction is complete. Filtration was carried out after the reaction to obtain a filtrate which was then vacuum-dried to obtain 220 g CsDFP. The yield thereof was calculated, the purity was measured by AAS, the moisture content was measured by Karl Fischer moisture meter, the acid value was measured by acid-base titration method, and the results are shown in Table 1.

Example 3

Pretreatment $LiPO_2F_2$ and $Cs_2CO_3$ were pretreated by vacuum drying and blast drying respectively, and molecular sieves were added to absolute ethanol for dehydration to reduce the moisture content of the raw materials as much as possible, preferably the moisture content is $\leq 100$ ppm.

Preparation 215.8 g pretreated $LiPO_2F_2$ was added to a 1 L of three-necked round flask, 323.7 g absolute ethanol was added, which were placed in an oil bath with the temperature of 70° C., and carried with reflux condensation and stirred fully for 15 min; additionally, 325.8 g pretreated $Cs_2CO_3$ was dissolved in absolute ethanol, which were then added to the dropping funnel, and slowly dropped into the three-necked round flask for reaction, and the reaction was continued for 5-6 hours. During the reaction process, white precipitates of lithium carbonate were produced continually, and the reaction was not complete until no precipitate was produced. Filtration was carried out after the reaction to obtain a filtrate which was then vacuum-dried to obtain 449 g CsDFP. The yield thereof was calculated, the purity was measured by AAS, the moisture content was measured by Karl Fischer moisture meter, the acid value was measured by acid-base titration method, and the results are shown in Table 1.

Example 4

Pretreatment $LiPO_2F_2$ and C2Cs2O4 were pretreated by vacuum drying and blast drying respectively, and molecular sieves were added to absolute ethanol for dehydration to reduce the moisture content of the raw materials as much as possible, preferably the moisture content is $\leq 100$ ppm.

Preparation 215.8 g pretreated $LiPO_2F_2$ was added to a 1 L of three-necked round flask, 323.7 g absolute ethanol was added, which were placed in an oil bath with the temperature of 70° C., and carried with reflux condensation and stirred fully for 15 min; additionally, 353.8 g pretreated C2Cs2O4 was dissolved in absolute ethanol, which were then added to the dropping funnel, and slowly dropped into the three-necked round flask for reaction, and the reaction was continued for 5-6 hours. During the reaction process, white precipitates of lithium oxalate were produced continually, and the reaction was not complete until no precipitate was produced. Filtration was carried out after the reaction to obtain a filtrate which was then vacuum-dried to obtain 406.9 g CsDFP. The yield thereof was calculated, the purity was measured by AAS, the moisture content was measured by Karl Fischer moisture meter, the acid value was measured by acid-base titration method, and the results are shown in Table 1.

TABLE 1

| Examples | Different Cesium Sources | Experimental Results of CsDFP | | | |
|---|---|---|---|---|---|
| | | Yeild/% | Purity/% | Moisture/ ppm | Acid value/ ppm |
| Ex. 1 | CsF | 98 | 99.8 | 40 | 80 |
| Ex. 2 | CsOH | 94 | 99.5 | 20 | 10 |
| Ex. 3 | $Cs_2CO_3$ | 96 | 99.6 | 30 | 20 |
| Ex. 4 | C2Cs2O4 | 87 | 99.2 | 70 | 80 |

As seen from the results in Table 1, when CsF, CsOH, $Cs_2CO_3$ or C2Cs2O4 is selected as the cesium source, the yield of the prepared CsDFP can reach 87-98%, the purity can reach more than 99%, and the moisture and acid value are both below 100 ppm. By this token, the preparation method of CsDFP in the present invention has easy-to-obtain raw materials, high yield and few impurities; preferably CsOH or $Cs_2CO_3$ is selected as the cesium source, that's because CsF may bring violent reaction, the reaction condition is difficult to control, and the yield and the purity of C2Cs2O4 are low, and the moisture and acid value are high.

Part Two of the Experiment (Secondary Battery Preparation)

The four kinds of CsDFP obtained in Example 2 with different contents were respectively used in negative electrode slurry to prepare a lithium secondary battery, which were defined as Examples 5 to 8. The CsDFP in Examples 5 to 8 was replaced respectively with $LiPO_2F_2$ and $CsF_6P$ to obtain Comparative Examples 1 and 2, and the components in the electrolyte in Examples 5 to 8 were adjusted to obtain Comparative Examples 3 to 8, as shown in Table 2. CsDFP in all comparative examples was also derived from Example 2. The preparation process of the lithium secondary battery follows, and the specific components and contents in the process are determined according to the parameters in Table 2.

Preparation of Negative Electrode Plate 940 g artificial graphite, 25 g CsDFP, 5 g carboxymethyl cellulose, 10 g conductive carbon black and an appropriate amount of deionized water were added to a planetary dispersion vacuum mixer. Then the equipment power, vacuum valve and vacuum pump were turned on, slow stirring was started when the vacuum degree dropped to –80 Kpa, for 2 hours, and stirring was stopped. 6 g styrene-butadiene rubber was poured into the vacuum mixer and stirred slowly for 0.5 hour in the vacuum state; another 6 g styrene-butadiene rubber was then poured into the vacuum mixer and stirred rapidly for 1.5 hours in the vacuum state; and another 8 g styrene-butadiene rubber was poured into the vacuum mixer and stirred rapidly for 1.5 hours in the vacuum state, to obtain a uniform negative electrode slurry, whose viscosity was 3000 mPa·s after air exhausted and tested. The negative electrode slurry was prepared into a negative electrode plate by conventional beating, coating, tableting, drying and rolling processes, and the compaction density of the negative electrode material was 1.55 g/cm$^3$.

Preparation of Positive Electrode Plate $LiCoO_2$ used as the main active material of the positive electrode was prepared into a positive electrode plate according to conventional preparation process of positive electrode plate, and the compaction density of the positive electrode material was 4.15 g/cm$^3$.

Electrolyte Preparation

All samples were prepared in a nitrogen atmosphere glovebox (<1 ppm of $O_2$ and $H_2O$) by uniformly mixing ethylene carbonate, diethyl carbonate and ethyl methyl carbonate in a mass ratio of 2:1:2 to obtain 85 g non-aqueous organic solvent. Then the mixed solution was sealed, placed and frozen for 2 hours in a freezing chamber (–4° C.). Then, in a nitrogen atmosphere glovebox (<1 ppm of $O_2$ and $H_2O$), 15 g $LiPF_6$ was slowly added to the mixed solution with stirring until a homogeneous solution and the electrolyte was obtained. Additives for the electrolyte could be added at the same time as $LiPF_6$ was added.

Preparation of Soft-package Lithium Secondary Battery

The above-mentioned positive and negative electrode plates and separators were used to prepare a soft-package battery with reference to common battery winding process, and the rated capacity of the soft-package battery is designed to be 3000 mAh. The soft-package battery was prepared according to conventional processes such as liquid injection, sealing, aging, chemical-forming, air pumping and sealing, and capacity grading, etc.

It should be further explained that the preparations of the batteries of Comparative Examples 7 and 8 are different from those of Examples 5 to 8 and Comparative Examples 1 to 6. The preparation method of the lithium secondary battery of Comparative Example 7 follows.

Preparation of Negative Electrode Plate 940 g artificial graphite, 5 g carboxymethyl cellulose, 10 g conductive carbon black and an appropriate amount of deionized water were added to a planetary dispersion vacuum mixer. Then the equipment power, vacuum valve and vacuum pump were turned on, slow stirring was started when the vacuum degree dropped to –80 Kpa, for 2 hours, and stirring was stopped. 6 g styrene-butadiene rubber was poured into the vacuum mixer and stirred slowly for 0.5 hour in the vacuum state; another 6 g styrene-butadiene rubber was then poured into the vacuum mixer and stirred rapidly for 1.5 hours in the vacuum state; and another 8 g styrene-butadiene rubber was poured into the vacuum mixer and stirred rapidly for 1.5 hours in the vacuum state, to obtain a uniform negative electrode slurry, whose viscosity was 3000 mPa·s after air exhausted and tested. The negative electrode slurry was prepared into a negative electrode film by conventional beating and coating. Specifically, the surface of the negative electrode membrane was coated with cesium hexafluorophosphate acetonitrile solution (obtained by dissolving lithium bistrifluoromethylsulfonimide ($C_2F_6LiNO_4S_2$) and $CsF_6P$ in acetonitrile solution, ultrasonication for 20 min, and magnetically stirring for 4 hours; adding polyethylene oxide powder, ultrasonication for 20 min, and magnetically stirring for 24 hours, wherein the molar ratio of polyethylene oxide, $C_2F_6LiNO_4S_2$ and $CsF_6P$ is 10:1:0.5), and the solution was dried and rolled to obtain a negative electrode plate with a $CsF_6P$ coating on the surface. The thickness of the $CsF_6P$ coating was 20 μm, and the compaction density of the negative electrode material was 1.55 g/cm³.

Preparation of Positive Electrode Plate $LiCoO_2$ used as the main active material of the positive electrode was prepared into a positive electrode plate according to conventional preparation process, and the compaction density of the positive electrode material was 4.15 g/cm³.

Electrolyte Preparation

All samples were prepared in a nitrogen atmosphere glovebox (<1 ppm of $O_2$ and $H_2O$) by uniformly mixing ethylene carbonate, diethyl carbonate and ethyl methyl carbonate in a mass ratio of 2:1:2 to obtain 85 g non-aqueous organic solvent. Then the mixed solution was sealed, placed and frozen for 2 hours in a freezing chamber (−4° C.). Then, in a nitrogen atmosphere glovebox (<1 ppm of $O_2$ and $H_2O$), 15 g $LiPF_6$ was slowly added to the mixed solution with stirring until a homogeneous solution and the electrolyte was obtained. Additives for the electrolyte could be added at the same time as $LiPF_6$ was added.

Preparation of Soft-package Lithium Secondary Battery

The above-mentioned positive and negative electrode plates and separators were used to prepare a soft-package battery with reference to common battery winding process, and the rated capacity of the soft-package battery is designed to be 3000 mAh. The soft-package battery was prepared according to conventional processes such as liquid injection, sealing, aging, chemical-forming, air pumping and sealing, and capacity grading, etc.

On the basis of Comparative Example 7, $CsF_6P$ was replaced with CsDFP in Comparative Example 8, that is, a CsDFP coating was formed on the surface of the negative electrode plate, and the coating thickness was 20 μm. The remaining preparation steps were the same as those in Comparative example 7.

TABLE 2

| Examples | Amount of phosphate added in negative electrode slurry/g | Electrolyte components | | |
| | | Non-aqueous organic solvent/ Mass (g) | $LiPF_6$/ Mass (g) | Additives/ Mass (g) |
| --- | --- | --- | --- | --- |
| Ex. 5 | 25 g CsDFP | EC/DEC/EMC (2:1:2)/85 | 15 | / |

TABLE 2-continued

| Examples | Amount of phosphate added in negative electrode slurry/g | Electrolyte components | | |
| | | Non-aqueous organic solvent/ Mass (g) | $LiPF_6$/ Mass (g) | Additives/ Mass (g) |
| --- | --- | --- | --- | --- |
| Ex. 6 | 35 g CsDFP | EC/DEC/EMC (2:1:2)/85 | 15 | / |
| Ex. 7 | 45 g CsDFP | EC/DEC/EMC (2:1:2)/85 | 15 | / |
| Ex. 8 | 50 g CsDFP | EC/DEC/EMC (2:1:2)/85 | 15 | / |
| Com. 1 | 35 g $LiPO_2F_2$ | EC/DEC/EMC (2:1:2)/85 | 15 | / |
| Com. 2 | 35 g CsFeP | EC/DEC/EMC (2:1:2)/85 | 15 | / |
| Com. 3 | / | EC/DEC/EMC (2:1:2)/85 | 15 | / |
| Com. 4 | / | EC/DEC/EMC (2:1:2)/84 | 15 | $LiPO_2F_2$/1 |
| Com. 5 | / | EC/DEC/EMC (2:1:2)/84 | 15 | $CsF_6P$/1 |
| Com. 6 | / | EC/DEC/EMC (2:1:2)/84.95 | 15 | CsDFP/0.05 |
| Com. 7 | / | EC/DEC/EMC (2:1:2)/85 | 15 | / |
| Com. 8 | / | EC/DEC/EMC (2:1:2)/85 | 15 | / |

Figure 2:
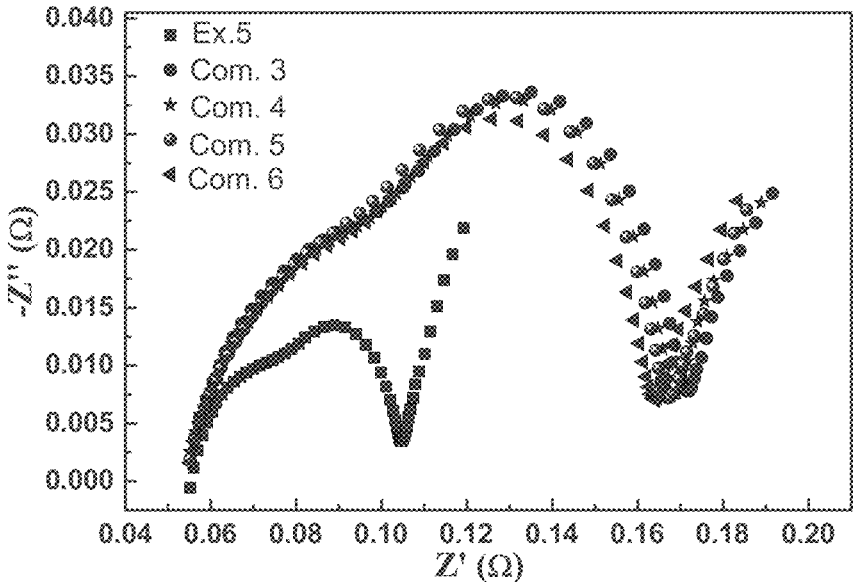
FIG. 2 is a schematic diagram of the impedance of the soft-pack lithium secondary batteries in Example 5 and Comparative Examples 3 to 6 after cycled at 45° C. for 300 cycles.
Figure 3:
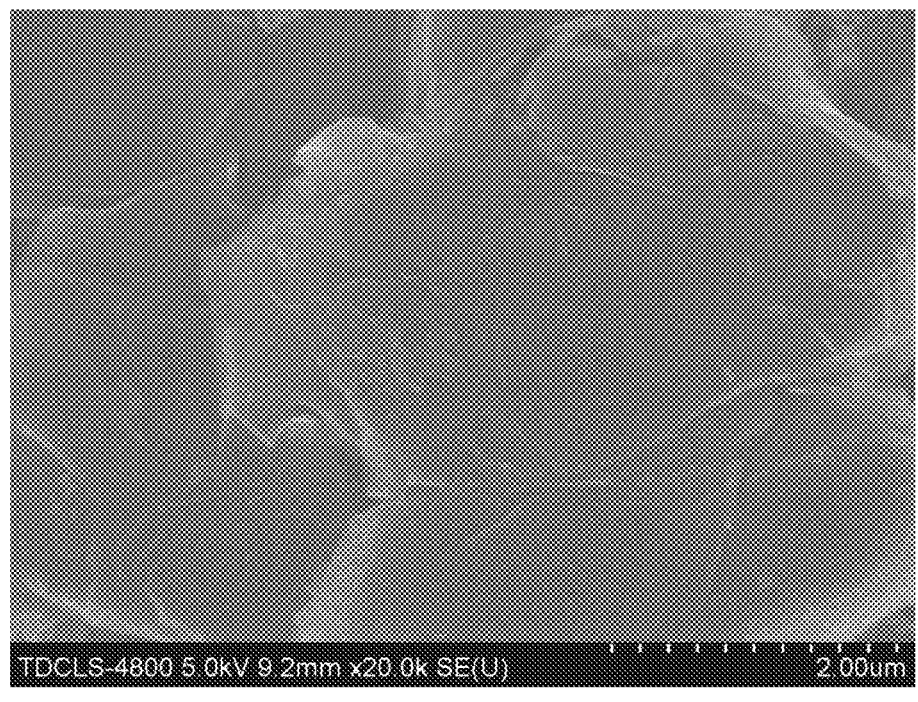
FIG. 3 is a scanning electron microscope image of the negative electrode plate of the soft-package lithium secondary battery of Example 5 before liquid injection.
Figure 4:
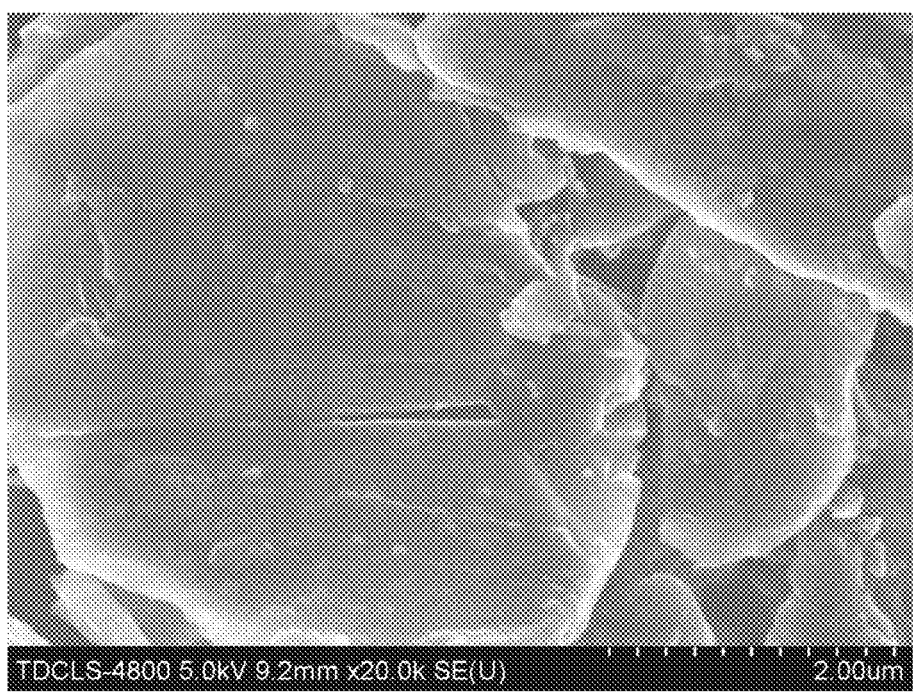
FIG. 4 is a scanning electron microscope image of the negative electrode plate of the soft-package lithium secondary battery of Example 5 after cycled at high temperature.
Figure 5:
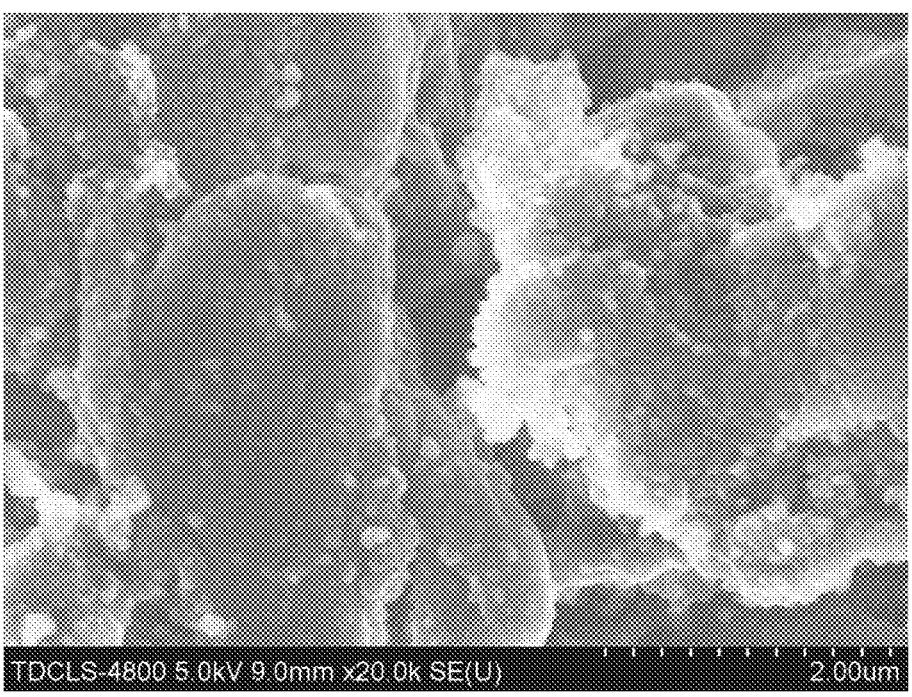
FIG. 5 is a scanning electron microscope image of the negative electrode plate of the soft-package lithium secondary battery of Comparative Example 4 after cycled at high temperature.
Figure 6:
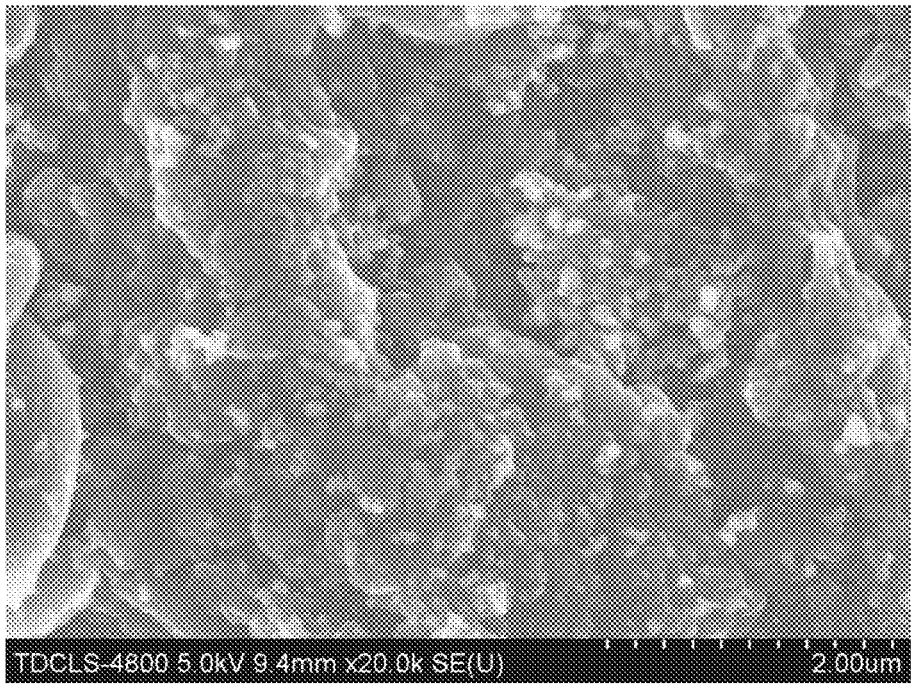
FIG. 6 is a scanning electron microscope image of the negative electrode plate of the soft-pack lithium secondary battery of Comparative Example 5 after cycled at high temperature.
Figure 7:
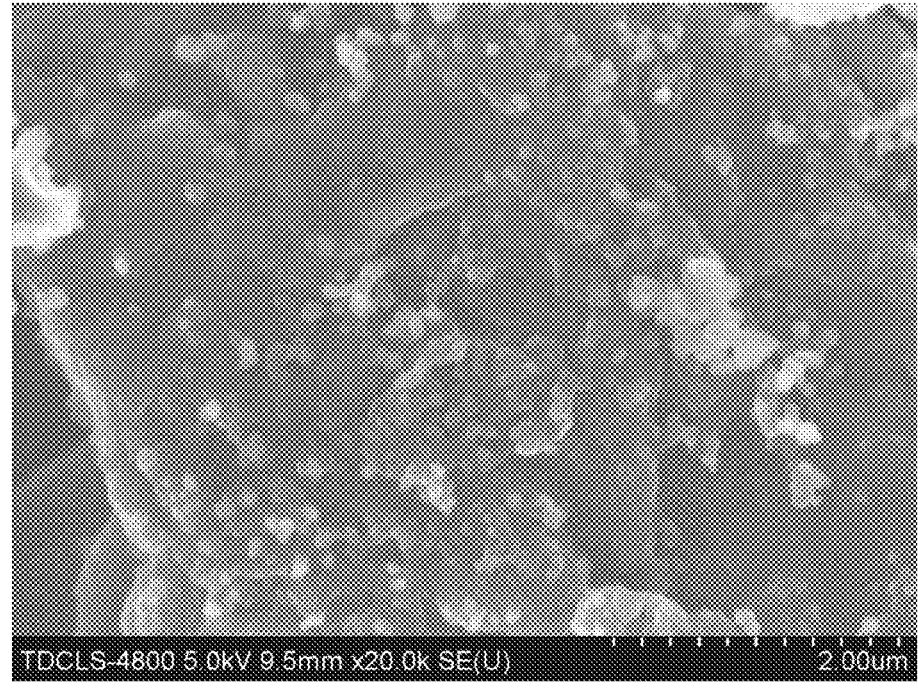
FIG. 7 is a scanning electron microscope image of the negative electrode plate of the soft-package lithium secondary battery of Comparative Example 6 after cycled at high temperature.

The soft-package lithium secondary batteries of Examples 5 to 8 and Comparative Examples 1 to 8 were respectively tested for normal temperature cycle performance, high temperature cycle performance, high temperature storage performance, 3C rate discharge performance and low temperature discharge performance, the test conditions as follows, and the results are shown in Table 3. The impedance tests of the soft-package lithium secondary batteries of Example 5 and Comparative Examples 4 to 6 were carried out after formation and after 200 cycles at 45° C., and the test results are shown in FIGS. 1 and 2. The SEM test was performed on the soft-package lithium secondary battery of Example 5 before liquid injection and after 200 cycles at 45° C., and the test results are shown in FIGS. 3 and 4. The SEM s tests were performed on the soft-package lithium secondary batteries of Comparative Examples 4 to 6 after 200 cycles at 45° C., and the test results are shown in FIGS. 5 to 7.

(1) Normal Temperature Cycle Performance Test

The soft-package lithium secondary batteries were placed in a room (25° C.), charged to 4.5V at a constant current of 10, then charged at a constant voltage until the current reached 0.05C, then discharged to 3.0V at a constant current of 10, and then that cycle was repeated, with one measurement for direct current internal resistance (DCIR) was performed for every 50 cycles. The discharge capacity of the first cycle and the discharge capacity of the last cycle, and each DCIR measurement result were recorded. The capacity retention rate and DCIR rising rate under normal temperature cycle were calculated by the following formulas.

Capacity retention rate (%)=Discharge capacity of the last cycle/Discharge capacity of the first cycle×100%

DCIR rising rate (%)=DCIR of the last 50 cycles/ DCIR of the first cycle×100%

(2) High Temperature Cycle Performance Test

The soft-package lithium secondary batteries were placed in an oven (45° C.), charged to 4.5V at a constant current of 10, then charged at a constant voltage until the current reached 0.05C, then discharged to 3.0V at a constant current of 10, and then that cycle was repeated, with one measurement for direct current internal resistance (DCIR) was performed for every 50 cycles. The discharge capacity of the first cycle and the discharge capacity of the last cycle, and each DCIR measurement result were recorded. The capacity retention rate and DCIR rising rate under high temperature cycle was calculated by the following formulas.

Capacity retention rate (%)=Discharge capacity of the last cycle/Discharge capacity of the first cycle×100%

DCIR rising rate (%)=DCIR of the last 50 cycles/DCIR of the first cycle×100%

(3) Low Temperature Discharge Performance Test

The soft-package lithium secondary batteries were charged to 4.5V at a constant current of 0.5 C, and then charged at a constant voltage until the current reached 0.05 C, and discharged to 3.0 V at a constant current, and a discharge capacity was recorded as C0; Then the soft-package lithium secondary batteries were charged to 4.5V again according to the above method, and then placed in a low temperature oven (−20° C.) for 4 hours, and discharged at a constant current of 0.33 C under the low temperature of −20° C., and a discharge capacity was recorded as C1.

Capacity retention rate of low temperature discharge (%)=C1/C0×100%

(4) High Temperature Storage Performance Test

The batteries were charged to 4.5V at a constant current of 0.5 C, then charged at a constant voltage until the current reached 0.05 C, and then discharged to 3.0 V at a constant current, a discharge capacity was recorded as C0, and the thickness of the batteries was measured with a vernier caliper as V0; Then, the batteries were charged to 4.5V according to the above method, then placed in a high temperature oven of 85° C. for 8 hours, and then discharged at a current of 0.5 C at room temperature, and the discharge capacity was recorded as C1, and the thickness of the batteries was measured with a vernier caliper as V1; then the batteries were charged and discharged again according to the above method, and the discharge capacity was recorded as C2.

Capacity retention rate of high temperature storage (%)=C1/C0×100%

Capacity recovery rate of high temperature storage (%)=C2/C0×100%

Thickness expansion of high temperature storage (%)=V1/V0×100%

(5) 3C Rate Discharge Performance Test

The batteries were charged to 4.5V at a constant current of 0.5 C, then charged at a constant voltage until the current reached 0.05 C, and then discharged to 3.0 V at a constant current, and a discharge capacity was recorded as C0; then the batteries were charged to 4.5V again according to the above method, and discharged at a constant current of 3 C, and a discharge capacity was recorded as C1.

Capacity retention rate of rate discharge (%)=C1/C0×100%

(6) Impedance test

The formed soft-package lithium secondary batteries of Example 5 and Comparative Examples 3 to 6 were discharged to SOC=50%, and the batteries were placed on an electrochemical workstation for EIS test, and the results are shown in FIG. 1.

The soft-package lithium secondary batteries of Example 5 and Comparative Examples 3 to 6 were discharged to SOC=50% after being cycled at 45° C. for 300 cycles, and the batteries were placed on an electrochemical workstation for EIS test, and the results are shown in FIG. 2.

(7) Scanning Electron Microscope (SEM) Test

The soft-package lithium secondary battery of Example 5 was disassembled before liquid injection, and the negative electrode plate was taken for SEM test.

The soft-package lithium secondary batteries of Example 5 and Comparative Examples 4 to 6 were disassembled after being cycled at 45° C. for 200 cycles, and the negative electrode plates were taken for SEM test.

TABLE 3

| Examples | 1 C/1 C Retention rate after 300 cycles | | Temperature discharge performance | Capacity retention rate of 3 C | High temperature storage performance (85° C. 8 h) | | |
|---|---|---|---|---|---|---|---|
| | Cycled at 25° C. | Cycled at 45° C. | (−20° C. 0.33 C) | rate discharge | Capacity retention rate | Capacity recovery rate | Thickness expansion |
| Ex. 5 | 85.4% | 82.3% | 83.1% | 75.6% | 86.9% | 91.2% | 0.8% |
| Ex. 6 | 87.2% | 84.6% | 83.7% | 76.1% | 85.8% | 90.6% | 0.7% |
| Ex. 7 | 83.9% | 81.5% | 82.8% | 76.3% | 85.4% | 91.0% | 0.8% |
| Ex. 8 | 83.1% | 80.5% | 83.1% | 76.4% | 86.1% | 91.3% | 0.8% |
| Com. 1 | Sharp decline | Sharp decline | 46.3% | 22.6% | 12.2% | 14.3% | 81.5% |
| Com. 2 | 61.3% | Sharp decline | 51.6% | 42.3% | 66.2% | 71.5% | 8.4% |
| Com. 3 | 65.3% | Sharp decline | 61.58% | 41.44% | 73.6% | 78.1% | 3.5% |
| Com. 4 | 70.3% | 62.1% | 72.2% | 51.8% | 75.4% | 78.6% | 3.3% |
| Com. 5 | 68.1% | Sharp decline | 71.3% | 46.2% | 71.5% | 76.2% | 4.6% |

US 12,583,748 B2

13                                                                                                         14

TABLE 3-continued

| Examples | 1 C/1 C Retention rate after 300 cycles | | Temperature discharge performance | Capacity retention rate of 3 C | High temperature storage performance (85° C. 8 h) | | |
| | Cycled at 25° C. | Cycled at 45° C. | (−20° C. 0.33 C) | rate discharge | Capacity retention rate | Capacity recovery rate | Thickness expansion |
| --- | --- | --- | --- | --- | --- | --- | --- |
| Com. 6 | 70.2% | 61.7% | 80.6% | 76.3% | 81.5% | 85.1% | 1.2% |
| Com. 7 | 65.3% | Sharp decline | 68.6% | 69.2% | 69.1% | 73.2% | 6.9% |
| Com. 8 | Sharp decline | Sharp decline | 33.6% | <10% | <10% | <10% | >100% |

It's noted that, retention rate of batteries below 50% was called as "sharp decline" in this disclosure.

As seen in Table 3, the cycle performance, rate performance and high temperature storage performance of the lithium secondary batteries of Examples 5 to 8 in which CsDFP was added to the negative electrode slurry, especially the high temperature cycle performance are improved greatly, by comparison with Comparative Examples 1 to 6. CsDFP and other materials are compatible and uniformly dispersed in the negative electrode slurry, since CsDFP is easily soluble in water and unreactable with water. In addition, CsDFP has a very low solubility (<1000 ppm) in carbonate-based and/or carboxylate-based electrolytes, thus the CsDFP in the negative electrode plate will gradually release into the electrolyte and participate in the electrochemical reaction, after the negative electrode plate is wetted in the electrolyte during battery cycling. Furthermore, the activation energy of Li⁺ intercalation in the negative electrode is reduced due to the existence of Cs⁺, that is, it's easier for the lithium ions to intercalate in or deintercalate from the negative electrode, which leads to a better rate performance. On the other hand, the impedance growth rate of the batteries is reduced and the high-temperature storage performance is excellent since $PO_2F_2$— participates in the electrochemical reaction to form a stable low-impedance SEI film on the surface of the negative electrode plate. Moreover, films are continuously formed to repair the SEI films under the gradual release of CsDFP, which is conducive to inhibiting the growth of lithium dendrites during long-term high-rate cycling, thereby obtaining an improved cycle performance.

In Comparative Example 1, $LiPO_2F_2$ was added to the negative electrode slurry. As known, $LiPO_2F_2$ was unstable in water and easily decomposed into $POF_3$ when preparing aqueous negative electrode slurry, and $POF_3$ would be hydrolyzed to produce HF which corrodes the electrode interface, to seriously deteriorate the cycle performance and high and low temperature performance.

In Comparative Example 2, $CsF_6P$ was added to the negative electrode slurry, which leads to poor cycle performance and poor high and low temperature performance as well. That's because $CsF_6P$ would be dissolved excessively in the electrolyte during the cycle process, causing the negative electrode structure to collapse significantly, and the SEI films will not be repaired in time under this case, which deteriorates the electrochemical performance accordingly.

In Comparative Examples 4 to 5, $LiPO_2F_2$ or $CsF_6P$ was added to the electrolyte, which improved the rate and storage performance of the batteries in a certain extent; however, the cycle performance was not desirable since the SEI film formed by one-time consumption may be gradually ruptured and can no longer be repaired. As shown in FIG. 1 and FIG.

2, the impedances of Comparative Examples 4 and 5 are significantly higher than those of Example 5 after 300 cycles at 45° C., indicating a poor performance of SEI films formed on the surface of the negative electrode plates in Comparative Examples 4 and 5. The comparison of FIGS. 3 to 6 also proofs that, the surfaces of the negative electrode plates in Comparative Examples 4 and 5 are not smooth, indicating a poor performance of the films formed on the surfaces.

As shown in the comparisons between Example 5 and Comparative Example 6, the cycle performance, the high and low temperature performance and the rate performance of the lithium ion batteries are improved, when a small amount of CsDFP were added in the electrolyte. But the cycle performance (especially high temperature performance) in Comparative Example 6 is significantly lower than that in Example 5, since the SEI films cannot be repaired as the Example 5. As shown in FIG. 1 and FIG. 2, the impedance of Comparative Example 6 is significantly higher than those of Example 5 after 300 cycles at 45° C., indicating a poor performance of SEI films formed on the surface of the negative electrode plates in Comparative Example 6. The comparisons of FIGS. 3 to 4, and 7 also proof that, the surface of the negative electrode plates in Comparative Example 6 is not smooth, indicating a poor performance of the films formed on the surface.

Compared with Comparative Example 2, a $CsF_6P$ coating was formed on the surface of the negative electrode plate instead of inside the negative electrode plate in Comparative Example 7, which may not lead to a significant collapse of the negative electrode structure, but weakens the wettability performance of the electrolyte in the negative electrode plate. As a result, it is difficult for the electrolyte to form a better SEI film on the surface of the negative electrode, and it is also difficult for lithium ions to be intercalated in or deintercalated from the negative electrode plate, therefore a poor electrochemical performance is caused.

In Comparative Example 8, a CsDFP coating was formed on the surface of the negative electrode plate. As known, CsDFP has a very low solubility in carbonate-based and/or carboxylate-based electrolyte, that is to say, it is difficult for the electrolyte to wet the negative electrode due to the existence of the CsDFP coating, which directly deteriorates the performance of the battery.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A preparation method of a negative electrode plate, comprising:

beating a negative electrode slurry;

then coating the negative electrode slurry on a negative electrode current collector to form a negative electrode film;

drying and then rolling the negative electrode film to obtain a negative electrode plate;

wherein the negative electrode slurry comprises 90 to 96.25 parts by weight of negative electrode active material, 0.1 to 1 parts by weight of a thickener, 0.1 to 3 parts by weight of a conductive agent, 0.5 to 4.5 parts by weight of a binder and 2.5 to 5 parts by weight of cesium difluorophosphate, and the negative electrode slurry having a viscosity which is adjusted to 2000 to 14000 mPa·s with a solvent.

2. The preparation method according to claim 1, wherein the cesium difluorophosphate accounts for 2 to 5.5% of a total weight of the negative electrode film.

3. A secondary battery, comprising a positive electrode plate, a negative electrode plate and a separator spaced between the positive electrode plate and the negative electrode plate, wherein the negative electrode plate is obtained by beating a negative electrode slurry; coating the negative electrode slurry on a negative electrode current collector to form a negative electrode film; drying and then rolling the negative electrode film to obtain a negative electrode plate;

wherein the negative electrode slurry comprises 90 to 96.25 parts by weight of negative electrode active material, 0.1 to 1 parts by weight of a thickener, 0.1 to 3 parts weight of a conductive agent, 0.5 to 4.5 parts by weight of a binder and 2.5 to 5 parts by weight of cesium difluorophosphate, and the negative electrode slurry having a viscosity which is adjusted to 2000 to 14000 mPa·s with a solvent.

4. The secondary battery according to claim 3, wherein the negative active material is at least one selected from the group consisting of natural graphite, artificial graphite, lithium titanate, mesocarbon microbeads, silicon-carbon composite materials and silicon oxide; the thickener is carboxymethyl cellulose and/or sodium carboxymethyl cellulose; the conductive agent is at least one selected from the group consisting of conductive carbon black, acetylene black, carbon nanotubes, vapor-grown carbon fibers and graphene; and the binder is polyacrylic acid and/or styrene-butadiene rubber.

5. The secondary battery according to claim 3, wherein the cesium difluorophosphate accounts for 2 to 5.5% of a total weight of the negative electrode film.

6. The secondary battery according to claim 3, wherein the cesium difluorophosphate is obtained by carrying out ion exchange reactions with lithium difluorophosphate and a cesium source.

7. The secondary battery according to claim 6, wherein the cesium source is cesium fluoride, cesium hydroxide, cesium carbonate or cesium oxalate.

8. The secondary battery according to claim 7, wherein the cesium source is cesium fluoride, which is obtained by dissolving the lithium difluorophosphate in water at 0-10° C., then gradually adding the cesium fluoride to mix with the lithium difluorophosphate until a reaction is complete, and filtering and drying a filtrate.

9. The secondary battery according to claim 7, wherein the cesium source is cesium hydroxide, cesium carbonate or cesium oxalate, which is obtained by dissolving the lithium difluorophosphate in absolute ethanol, heating to 60-80° C. and carrying out reflux condensation, and slowly adding absolute ethanol solution of the cesium source and mixing until a reaction is complete, filtering and drying a filtrate.

10. The secondary battery according to claim 9, wherein both the cesium source and the lithium difluorophosphate are dehydrated before dissolved in the absolute ethanol, and moisture content of the cesium source and the lithium difluorophosphate is less than or equal to 100 ppm after dehydration.

*   *   *   *   *